United States Patent [19]

Warner

[11] Patent Number: 4,590,527
[45] Date of Patent: May 20, 1986

[54] POSITIONING SERVOMECHANISMS

[75] Inventor: Nicholas M. Warner, Livermore, Calif.

[73] Assignee: Burroughs Corporation, Detroit, Mich.

[21] Appl. No.: 551,399

[22] Filed: Nov. 14, 1983

[51] Int. Cl.⁴ .............................................. G11B 21/02
[52] U.S. Cl. ........................................ 360/78; 360/77
[58] Field of Search ............................ 360/75, 77, 78

[56] References Cited

U.S. PATENT DOCUMENTS

| 4,039,826 | 8/1977 | Wingate | 250/237 G |
| 4,355,273 | 10/1982 | DuVall | 318/561 |
| 4,480,279 | 10/1984 | Hashimoto | 360/78 |
| 4,481,613 | 11/1984 | Yokota | 369/56 |

FOREIGN PATENT DOCUMENTS

| 2091050 | 1/1972 | France. | |
| 2197174 | 3/1974 | France. | |
| 82/01097 | 4/1982 | PCT Int'l Appl. | 360/77 |
| 2054135 | 2/1981 | United Kingdom. | |

OTHER PUBLICATIONS

IEEE Transactions on Magnetics, vol. MAG-13, No. 3, May 1977, pp. 982-988, Magnetooptical Memory Experiments on a Rotating Mn-Cu-Bi Disk Medium, K. Chida et al.

Primary Examiner—George G. Stellar
Attorney, Agent, or Firm—Mark T. Starr; Kevin R. Peterson

[57] ABSTRACT

A positioning system, suitable for positioning a head adjacently to data tracks on a rotating magnetic data storage disc and employing a polyphase optical position detente transducer, overcomes positioning inaccuracies associated with the relative spacing between the polyphase position indicating signals by measuring the span of all the phases in terms of demand to produce head movement applied to a D/A convertor, calculating the ideal stopping positions, and applying the inverse error demand through the convertor when positioning the head.

9 Claims, 14 Drawing Figures

POSITIONING SERVOMECHANISMS

BACKGROUND TO THE INVENTION

1. Field of the Invention

The present invention relates to positioning servomechanisms and particularly relates to those feedback servomechanisms for positioning a load relatively to any selectable one of a plurality of rest positions in response to an applied demand signal which use a polyphase position transducer for providing a selectable one out of a plurality of distance-cyclic mutually staggered position indicating signals as the feedback signal. The present invention is applicable to servomechanisms for positioning a transducer at selectable radii on a rotatable information storage disc, which application is illustrative of and not restricting to its field of utility.

2. The Prior Art

It is well known to provide a data storage disc for storing retrievable informational data in a plurality of concentric, data storage tracks on a rotating disc accessed by the placing in adjacence thereto of a read/write transducer for the purpose of recording and/or reading data on or from a selectable one of the tracks. The placing of the transducer is generally achieved by issuing position commands to a transducer positioning servomechanism which responds by moving the transducer to interact with the selected track.

The transducer positioning servomechanism is known to employ an optical grating position transducer coupled to the transducer and providing a plurality of equi-periodic phase-staggered cyclic position indicating signals any one of which is selectable as the position feedback signal in the servomechanism. It has generally been the practice that the position of the transducer relative to the disc has been determined by which one of the position indicating signals is provided as the feedback signal. The transducer therefore has been provided with a plurality of rest positions across the radius of the disc, each one of which is intended to correspond to the transducer being interactive with a selected one of the tracks. It has also been the practice, as track densities (measured in terms of the number of tracks per unit radial distance of the disc) increase, to allow for the provision of a demand signal to the servomechanism so that correction can be made to the position of the transducer as achieved by the provision of one or other of the feedback signals. The higher track densities demand a higher precision in placing the transducer over a track so that the transducer can be prevented from reading from or writing on a data storage track adjacent to the intended track. Various schemes exist whereby a corection signal can be worked out and applied to correct for disc and disc drive mechanical errors and expansion or contraction. These schemes usually involve the use of one or more servo tracks on the disc and rely upon an implied accuracy and predictability of the relative spacing between the plural position indicating signals from the transducer not only at any one radius of the disc but also across the entire surface of the disc where-over the transducer is to be located.

The optical grating position transducer generally comprises a shutter and grating assembly. The shutter generally comprises a glass slide mechanically coupled to the data recording and/or reading transducer to move with it. The grating is generally affixed to the body of the disc drive and comprises a glass grating. Both the shutter and the grating have opaque lines thereon at the same regular spacing on both the lines having a width of half their repetition distance and being aligned at ninety degrees to the direction of travel of the shutter. A lightsource shines light through the combination of the shutter and the grating. The opaque lines on the grating are staggered in their spacing to one another in different areas of the grating. Each of the different areas of the grating is provided with its own photodetector. As the shutter moves each photodetector provides a cyclic, repetitive position indicating signal which is different in phase from the outputs of the other photodetectors. The outputs of the photodetectors can be variously combined with one another to give more desirable position indicating output signals.

The glass shutters and gratings are generally made by photographic processes. The exact widths of the opaque lines are dependent upon exposure and development times and therefore posess an element of unpredictability. The masters for the photographic process are generally photographic reductions of hand or machine produced masters themselves subject to errors when prepared and further subject to errors when photo-reduced. The shutters and masks are generally batch-prepared, there being many shutters and/or gratings on each sheet of glass subjected to the photographic process. The divergence of the light from the source used for exposure of the glass during the manufacturing process from parallelism means that different shutters and/or gratings have different angles of shadows along their lengths, making their pitches uneven not only with respect to one another but also with respect to different parts of themselves. In use the lightsource in the position indicating transducer may not be parallel and may cast shadows of the opaque lines in slightly different positions in each of the areas of the grating so that the resultant position indicating signals are not quite in their intended positions relative to one another. The circuits used for processing the outputs of the photodetectors can be subject to gain and offset errors causing mispositioning which varies with each signal used as the feedback signal. During the travel of the read/write transducer across the surface of the disc the alignment and spacing of the shutter relative to the grating can change altering the size and relative spacing of the different position indicating signals. All of the above effects ensure that the spacing between the position-indicating signals cannot be guaranteed at any point in the travel of the read/write transducer across the disc nor can the errors which are detectable at any one point be assured of remaining the same at all others.

It is therefore desirable to provide a positioning servomechanism wherein a selectable one of a plurality of equi-periodic spatially staggered position-indicating signals is usable as the feedback signal and wherein errors between the relative phases of the plurality of position indicating signals can be detected and compensated for across the extent of the positioning range of the servomechanism. It is further desirable that such a servomechanism be applicable to read/write transducer positioning in a disc data store.

The trend towards higher radial track densities requires the provision of glassware whereon the opaque lines are increasingly thinner and closer together. It is inconvenient and expensive to manufacture glassware of such fineness, and difficult and expensive to provide mounting for such glassware to be used in a position-indicating transducer. The angular error between opaque lines can cause large variations in transducer signal amplitudes and serious rounding of the ideally triangular output waveform. It takes much effort and time to establish the optimum manner of manufacture for a particular set of glassware and it is inconvenient to have to repeat this exercise each time it is desired to alter the radial track density. It is therefore desirable to provide a positioning servomechanism wherein the spacing between adjacent rest positions for the load can be rendered independent of the spacing of the cyclic position-indicating signals from a transducer and independent of any phase errors therebetween. It is further desirable that such a positioning servomechanism be employable for positioning a read/write transducer at selectable radii on a rotatable disc in a disc data store.

SUMMARY OF THE INVENTION

According to a first aspect, the present invention consists in a positioning system for a load, said system comprising a servomechanism and a controller, said servomechanism comprising a position transducer operable in response to a command signal to provide any selectable one out of a plurality of cyclic, staggered, load position indicating signals as the position feedback signal to position said load in any selectable one out of a corresponding plurality of rest positions, and a comparator coupled to receive some or all of said position indicating signals and operable to respond thereto to provide indication of said load being in any one of a corresponding plurality of test positions each intermediate between a different pair of said rest positions, said servomechanism being operable in response to a demand signal to move said load relatively to the selected one of said rest positions, and said controller being coupled to receive said indication from said comparator and being operable to provide said command signal and said demand signal and to respond to said indication from said comparator to select each of said rest positions in turn and to move said load to each of said test positions in adjacence thereto to determine the total amount of said demand signal required to move said load a distance equivalent to the distance between rest positions consecutively occurring as a result of the provision by said transducer of the same feedback signal, and to apportion said equivalent amount of demand among a plurality of operating positions to establish a linear spacing therebetween.

According to a second aspect the present invention consists in a system according to the first aspect wherein said load is a read/write transducer and said system is operable to position said read/write transducer over selectable ones out of a plurality of informational data storage tracks on a rotatable disc in a disc data store.

According to another aspect the present invention consists in a system according to the first or second aspects wherein said plurality of operating positions is equal in number to said plurality of rest positions.

According to another aspect the present invention consists in a system according to the first or second aspects wherein said plurality of operating positions is less in number than said plurality of rest positions.

According to another aspect the present invention consists in a system according to the first or second aspects wherein said plurality of operating positions is greater in number than said plurality of rest positions.

BRIEF DESCRIPTION OF THE PREFERRED EMBODIMENT

In a preferred embodiment a positioning system comprises a controller. The controller preferably provides a demand signal to a servomechanism, in which case the provision of the demand signal is preferably via a digital-to-analog convertor in receipt of a parallel binary digit demand word and providing an analog output to the servomechanism whose magnitude and sense is responsive to the magnitude and sign of the binary demand word. The demand signal is preferably provided as the additive input to a summing junction. A feedback signal is preferably provided as the subtractive input to the summing junction. The output of the summing junction is preferably the difference between the additive input and the subtractive input. The output of the summing junction is preferably coupled as the input to a power amplifier. The power amplifier preferably provides an output signal which is an enhanced representation of its input signal. The output of the power amplifier is preferably coupled to a load. The load preferably comprises an actuator. The load also preferably comprises a transducer for recording and/or reading data on a rotatable data storage disc, in which case the transducer is preferably a magnetic head and the system preferably positions the head to be adjacent to selectable data storage tracks on selectable radii of the disc.

A position transducer is preferably mechanically coupled to the head. The transducer preferably provides a plurality of cyclically repetitive, equi-periodic, phase staggered nominally equispaced signals indicative of the radius of the head on the disc. The output signals of the transducer are preferably provided as the signal input to a multiplexer. The multiplexer is preferably in receipt of a command signal. The controller preferably provides the command signal. The multiplexer preferably responds to the command signal to select one of the output signals from the transducer for coupling to the subtractive input to the summing junction as the feedback signal for the servomechanism.

The output signals of the transducer are preferably provided as the input to position detection logic circuit. The position detection logic circuit preferably compares selected pairs of the transducer output signals and provides indication of equality therebetween.

There are preferably four output signals from the transducer, in which case they are triangular waves with comparative nominal phases of zero, ninety, one hundred and eight and two hundred and seventy degrees. The position detection logic circuit preferably comprises first and second logic comparators. The first comparator preferably compares the zero degree signal with the ninety degree signal, in which case the output of the comparator is preferably logically true whenever the zero degree signal is more positive than the ninety degree signal. The second comparator preferably compares the zero degree signal with the two hundred and seventy degree signal, in which case the output of the second comparator is preferably logically true whenever the two-hundred and seventy degree signal is more positive than the zero degree signal.

The transducer is preferably optical. The transducer preferably comprises a glass moveable shutter. The shutter is preferably affixed to move with the head. The shutter preferably comprises a plurality of regularly spaced opaque lines having a width equal to half their repetition distance and aligned at right angles to the direction of movement of the shutter. The shutter preferably moves in parallel planar adjacense to a fixed grating. The grating preferably comprises four areas. Each of the four areas preferably comprises its own set of opaque lines similar in every way to the opaque lines on the shutter and parallel thereto. The sets of lines in the four areas are preferably offset from one another to provide four phases of output. A collimated lightsource preferably shines through the shutter and grating. A photosensor is preferably provided behind each of the four areas. The photosensors preferably provide outputs in proportion to the amount of light incident thereon. The transducer preferably comprises a first summing junction for subtracting the output of a first of the fourth photosensors from the output of a second to provide the zero degree signal. The transducer preferably comprises a second summing junction for subtracting the output of a third of said photosensors from the output of the fourth to provide the ninety degree signal. The transducer preferably comprises a first inverting amplifier for inverting the zero degree signal to provide the one hundred and eighty degree signal. The transducer preferably comprises a second inverting amplifier for inverting the ninety degree signal to provide the two hundred and seventy degree signal.

The outputs of the first and second comparators are preferably provided as input to the controller. The controller preferably provides and manipulates the demand signal to the servomechanism and the command signal to the multiplexer and responds to the output of the position determining logic to execute a command sequence for measuring the amount of demand required to span the feedback signals. Whenever a selected one of the transducer output signals is provided by the multiplexer as the feedback signal the head is preferably operable, in the absence of any demand signal, to take up any one of a plurality of rest positions across the surface of the disc, the positions being separated by the repetition distance of the opaque lines. Each of the plurality of rest positions for the zero degree feedback signal are preferably separated by a nominal quarter opaque line repetition distance from the rest positions for the ninety degree feedback signal, each of the rest positions for the ninety degree feedback signal are preferably separated from the one hundred and eighty degree rest positions by a nominal one quarter opaque line repetition distance, each of the rest positions for the one hundred and eighty degree feedback signal are preferably separated from the rest positions for the two hundred and seventy degree feedback signal by a nominal one quarter opaque line repetition distance, and each of the rest positions for the zero degree feedback signal is preferably separated from the rest positions for the two hundred and seventy degree feedback signal by a nominal one quarter opaque line repetition distance.

The command sequence preferably comprises the controller providing the command signal to the multiplexer to provide the zero degree signal as the feedback signal and thereafter applying a positive demand signal until the outut of the second comparator changes indicatively of zero degree signal becoming more positive than the two hundred and seventy degree signal, the controller noting the binary number so required. The controller then applies and notes the demand required to cause the output of the first comparator to change indicatively of the zero degree signal becoming less positive than the ninety degree signal. The controller repeats the process with each of the feedback signals in turn moving to and from each rest position and stepping the head across the disc. The controller then adds all of the demand signals together to give a demand span for use in positioning the head at selectable equi-spaced operating positions. There are preferably eight operating positions to give an effective track doubling.

The command sequence is preferably separately performed and its results separately applied to different adjacent groups of radii or zones of the disc.

The invention is further explained, by way of example, by the following description taken in conjunction with the appended drawings, in which:

DETAILED DESCRIPTION OF THE PREFERRED EMBODIMENT

Figure 1:
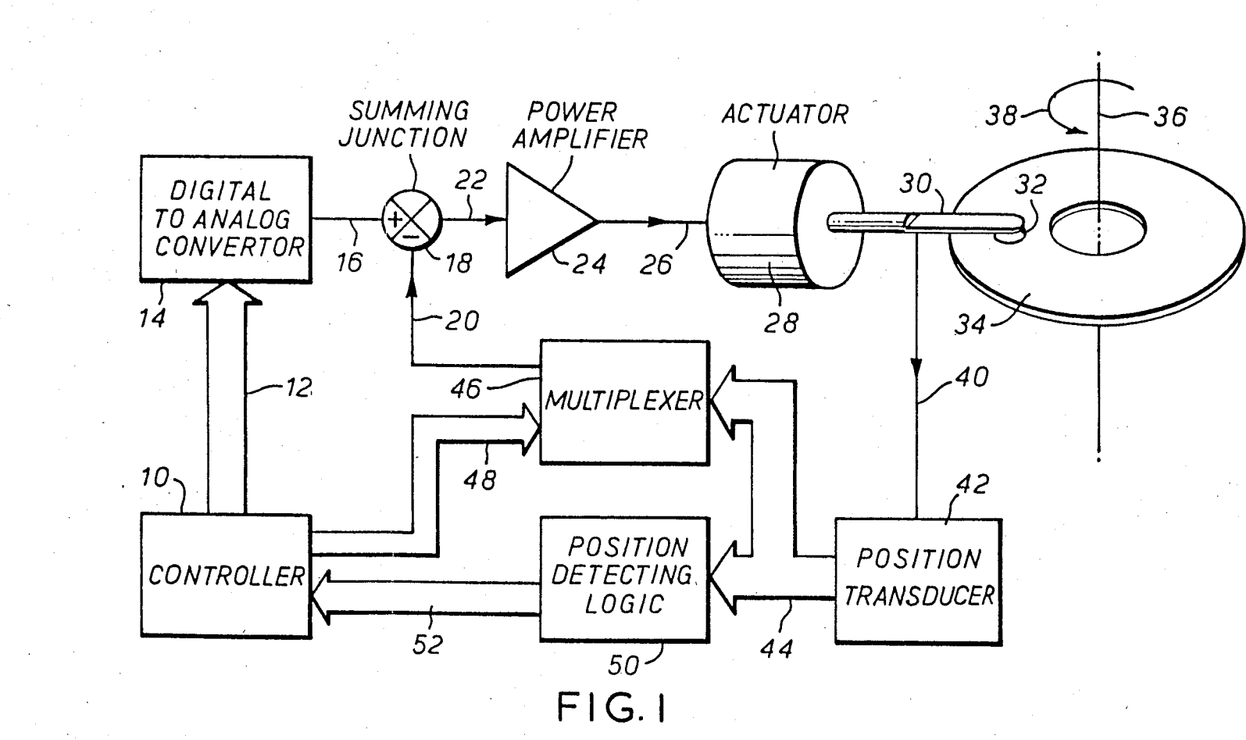
FIG. 1 shows a schematic block diagram of the preferred embodiment of the system of the present invention.

A controller 10 provides a parallel, plural binary digit demand word via a demand bus 12 to a digital-to-analog convertor 14. The demand word includes a sign bit indicative of whether the demand word is to be regarded as positive or negative. The analog convertor 14 accepts the demand word from the bus and provides an analog output signal of an analog output line 16 whose magnitude is proportional to the magnitude of the binary number of which the demand word is representative and whose polarity is appropriate to the sign bit.

The analog output line 16 is coupled as the additive input to a summing junction 18. The summing junction 18 is also in receipt of a subtractive input line 20. The summing junction 18 provides output on a summing junction output line 22 which is proportional to the difference between the signals on the analog output line 16 and the subtractive input line 22.

The junction output line 22 is coupled as the input to a power amplifier 24. The power amplifier 24 provides output on an amplifier output line 26 which is representative of its input. The amplifier output line 26 is coupled to provide motive power to an actuator 28. The actuator 28 comprises a coil of wire maintained in a magnetic field and subject to displacement forces proportional in strength and direction to the magnitude and sense of electrical current flow therein. The coil is provided with a mechanical coupling 30 to a magnetic read/write head 32 maintained in adjacense to a magnetic data storage disc 34 which is rotatable about its axis 36 as indicated by the arrow 38. The head 32 can be positioned at selectable radii on the disc 34 for the recording or recovery from any selectable one of a plurality of concentric circular data storage tracks on the disc of informational data.

A transducer mechanical coupling 40 couples the head 32 to a position transducer 42. The position transducer 42 provides a plurality of polyphase cyclically repetitive signals on a transducer output bus 44 each indicative of the radius of the head 32 on the disc 34. The transducer 42 provides four such signals, being nominal triangular waves at nominal phases of zero, ninety, one hundred and eighty and two hundred and seventy degrees to one another.

The transducer output bus 44 is coupled as the signal input to a multiplexer 46. The multiplexer 46 responds to the signal on the multiplexer command coupling 48, provided by the controller 10, to select just one of the output signals from the transducer 42 to be coupled as the signal on the subtractive input line 20 of the summing junction 18.

The transducer output bus 44 is coupled as the input to position detection logic 50 which is operable to examine the relationships between the magnitudes of the signals and provide indication to the controller 10 via a position logic output coupling 52 of equality between selected pairs thereof.

It is to be appreciated that the actuator can be other than of the type described, any bidirectionally operable electrical motor sufficing. The power amplifier 24 need not be a linear device and can saturate over some or all of its operational band. The load need not be a magnetic head on a disc and those skilled in the art will appreciate from the foregoing and following description that the invention can be applied in many situations. The summing junction 18 can be implemented as an actual device, or can be a notional element actually absorbed into an amplifier according to well known art. No compensation has been shown for the amplifier feedforward or the transducer feedback path. All those skilled in the art will be aware of many different ways of achieving such stabilizing compensation and it does not form an essential element of the present invention.

Figure 2:
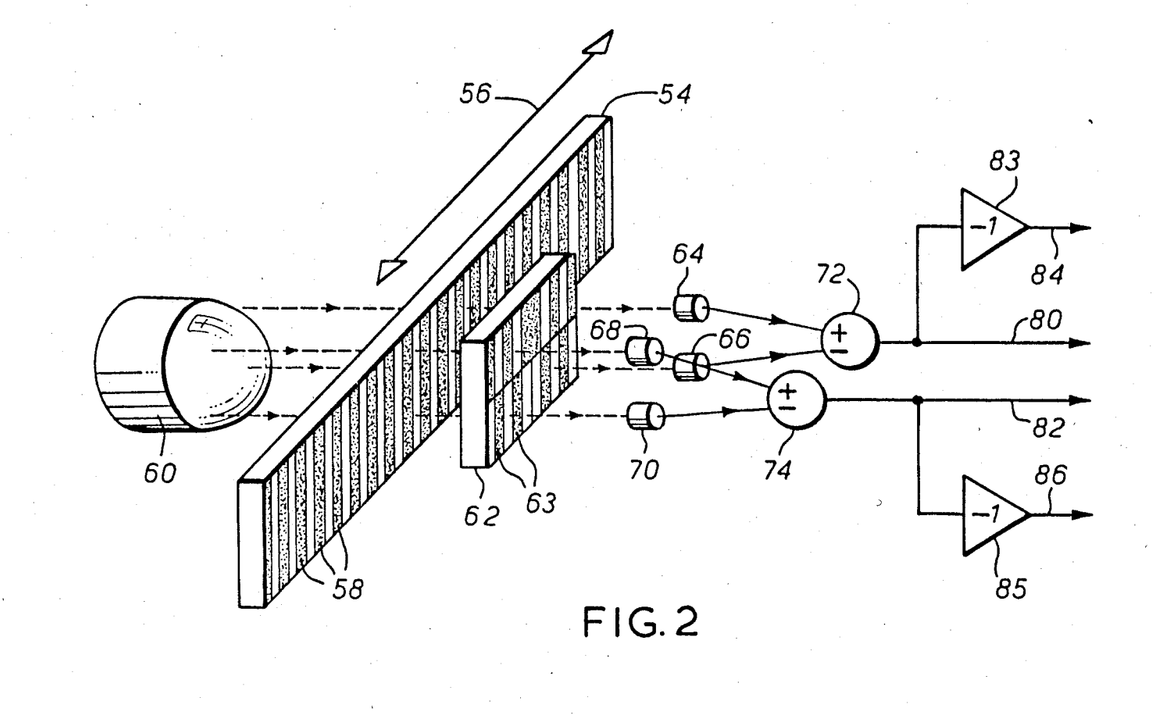
FIG. 2 shows an exploded view of the optical transducer for use as the position transducer of FIG. 1.

FIG. 2 shows an exploded view of the transducer 42 of FIG. 1 and further shows a schematic diagram of the electrical elements therein.

A slider 54 is affixed to the mechanical coupling 30 to move to and fro in a radial direction as the head 32 moves across the disc 34 as indicated by the two-headed arrow 56. The slider 56 bears a plurality of opaque lines 58, the slider itself being transparent and fabricated from glass or any other suitable light-transmitting material. The lines 58 are regularly spaced, have their principal axes at right angles to the movement of the slider 54, and have a width equal to half their regualr spacing.

A lightsource 60 shines a collimated beam of light through the slider 54 onto a transparent grating 62 affixed to the body of the disc drive. The grating 62 bears grating opaque lines 63 disposed in four separate areas of the grating 62, being of the same spacing and width as the slider opaque lines 58 but differently disposed from one another in the direction of movement of the slider 54 in each of the four areas.

First, second, third and fourth photosensors 64, 66, 68, 70 pick up the light passing through the four areas of the grating and each provides an output proportional to the amount of light incident thereon. The interaction of the slider opaque lines 58 and the four sets of opaque lines 63 in the four areas of the grating 62 causes the modulation of the light incident upon the photosensors 64, 66, 68, 70 each photosensor 64, 66, 68, 70 providing an output in a different phase because of the relative staggering of the patterns of opaque grating lines 63 in the four areas of the grating 62.

The output of the first photosensor 64 is provided as the additive input to a first signal summer 72 and the output of the second photosensor 66 is coupled as the subtractive input to the first signal summer 72. The output of the third photosensor 68 is coupled as the additive input to a second signal summer 74 and the output of the fourth photosensor 70 is coupled as the subtractive input to the second signal summer 74.

The output of the first signal summer is representative of the difference between the outputs of first and second photosensors 64, 66 and is provided as the first transducer output signal on the first transducer output line 80. For reasons which will later become apparent this signal will be known as the zero degree signal.

A first inverting amplifier 83 accepts the output of the first signal summer 72 and inverts its polarity providing output on the third transducer output line 84 as the third transducer output signal. For reasons which will later become apparent, this signal is known as the one hundred and eighty degree signal.

A second inverting amplifier 85 accepts the output of the second signal summer 74 as input and inverts its polarity providing output on the fourth transducer output line 86 as the fourth transducer output signal which, for reasons which will later become apparent, will be known as the two hundred and seventy degree signal.

Figure 3:
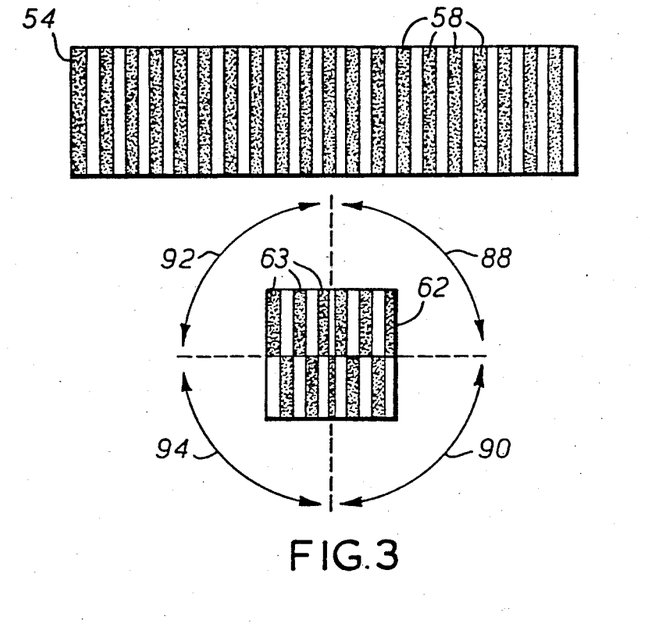
FIG. 3 shows detail of the shutter and grating of the optical position transducer of FIG. 2.

FIG. 3 shows detail of the slider opaque lines 58 and of the grating opaque lines 63.

The slider opaque lines 58 are equispaced on the slider 54 and cut off exactly fifty percent of the area of the slider 54, being of a width equal to half their relative repetition distance along the length of the slider 54.

The grating 62 is divided into a first quadrant 88, a second quadrant 90, a third quadrant 92 and a fourth quadrant 94. The first photosensor 64 receives light exclusively through the first quadrant 88. The second photosensor 66 receives light exclusively through the second quadrant 90. The third photosensor 68 receives light exclusively through the third quadrant 92. The fourth photosensor 70 receives light exclusively through the fourth quadrant 94.

The grating opaque lines 63 in each of the quadrants 88, 90, 92, 94 are exactly the same as the slider opaque lines 58. However, the opaque lines 63 in the first and second quadrants 88, 90 are inverses of one another and the opaque lines 63 in the second and third quadrants 92, 94 are also inverses of one another. Moreover the opaque lines 63 in the second and third quadrants 92, 94 are displaced relatively to the opaque lines 63 in the first and second quadrants by one half line 63 thickness (i.e. one quarter line 63 repetition distance) in the direction of movement of the slider 54. As the slider moves, the amount of light passing through the first quadrant 88 rises as the amount of light passing through the second quadrant 90 falls and vice versa. As the slider 54 moves the amount of light passing through the third quadrant 92 rises as the amount of light passing through the fourth quadrant 94 falls and vice versa. As the slider 54 moves the amount of light passing through the third quadrant 92 differs in phase, relatively to the position of the slider 54, from the amount of light passing through the first quadrant 88 by ninety degrees.

Figure 4A:
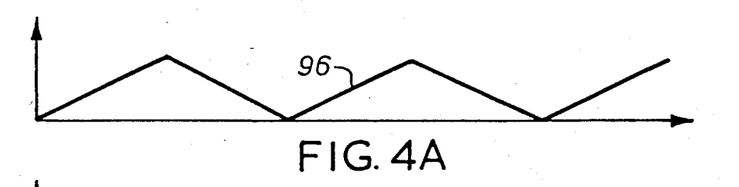
FIGS. 4A, 4B, 4C and 4D show the output signals of the first, second, third and fourth photosensors of FIG. 2

FIG. 4A shows a graph of the incident light on the first photosensor 64 coming through the first quadrant 88 which, by dint of action by the first photosensor 64, is also a graph of the output 96 of the first photosensor 64 against the radial position of the head 32 on the disc 34.

Figure 4B:
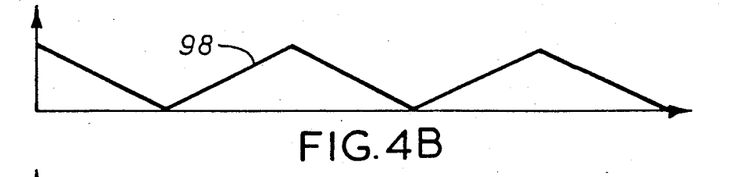
Figure 4C:
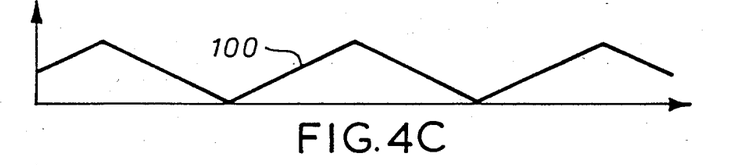
Figures 4D, 4E:
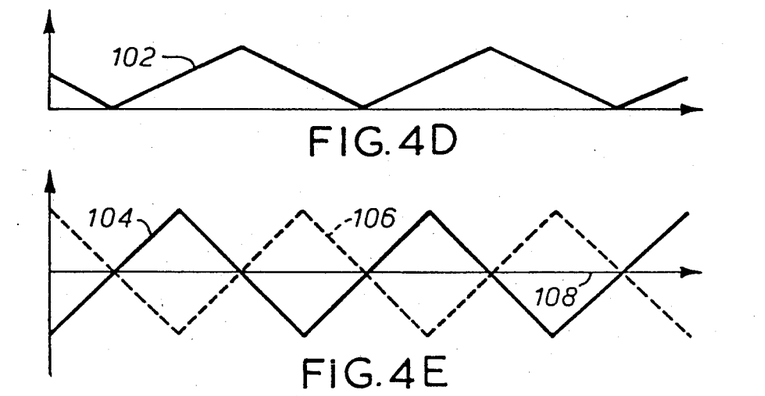
FIG. 4E shows the output signals of the first signal summer and first inverting amplifier of FIG. 2

Similarly, FIG. 4B shows the light through the second quadrant 90 onto the second photosensor 66 and therefore also represents the output 98 of the second photosensor 66 versus head radial position. FIG. 4C shows the light through the third quadrant 92 incident upon the third photosensor 68 and thereby also represents a graph 100 of the output of the third photosensor 68 versus radial position of the head 32 on the disc 34. FIG. 4D shows the amount of incident light passing through the fourth quadrant 94 onto the fourth photosensor 70 and thereby also represents a graph of the output 102 of the fourth photosensor 70 versus radial position of the head 32 on the disc 34. FIG. 4E shows in solid line the output 104 of the first signal summer 72 being the result of subtracting the output 98 of the second photosensor 66 from the output 96 of the first photosensor 64 and being the zero degree signal. FIG. 4E also shows, in dotted line, the output 106 of the first inverting amplifier 83 being the result of inverting the output 104 of the first signal summer 72 and being the one hundred and eighty degree signal.

Figure 4F:
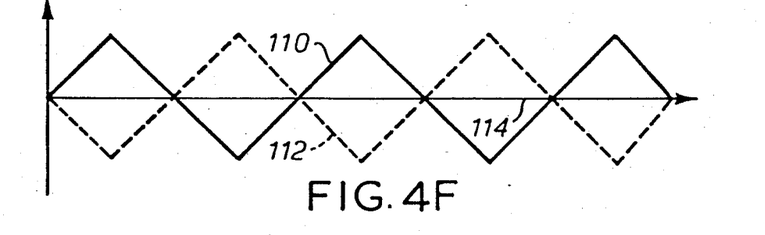
FIG. 4F shows the output signals of the second signal summer and second inverting amplifier of FIG. 2.

FIG. 4F shows, in solid line, the output 110 of the second signal summer 74 being the result of subtracting the output 102 of the fourth photosensor 70 from the output 100 of the third photosensor 68 and being the ninety degree signal.

FIG. 4F also shows in dotted line the output 112 of the second inverting amplifier 85 being the result of inverting the output 110 of the second signal summer 74 and being the two hundred and seventy degree signal.

Figure 5:
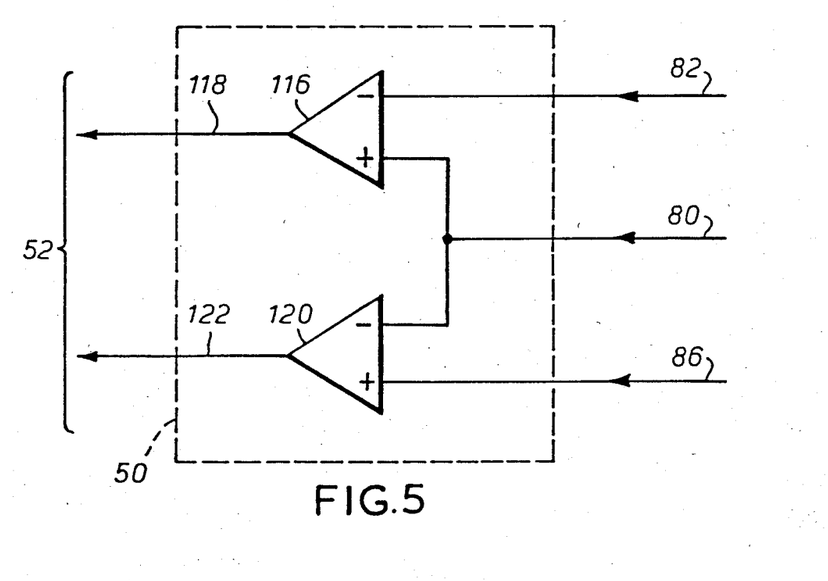
FIG. 5 shows a schematic diagram of the position detecting logic of FIG. 1.

FIG. 5 shows the position detecting logic 0.50 a first comparator 116 accepts the zero degree signal 104 from the first transducer output line 80 on its positive input and accepts the ninety degree signal 110 from the second transducer output line 82 on its inverting input, providing a logically true output signal on a first comparator output line 118, being a first part of the position logic output coupling 52 whenever the zero degree signal 104 is more positive than the ninety degree signal 110. A second comparator 120 accepts the zero degree signal 104 from the first transducer output line 80 on its negative input and accepts the two hundred and seventy degree signal 112 from the fourth transducer output line 84 on its positive input, providing a logically true output signal on a second comparator output line 122, being a second part of the position logic output coupling 52, whenever the two hundred and seventy degree signal 112 is more positive than the zero degree signal 104.

Figure 6A:
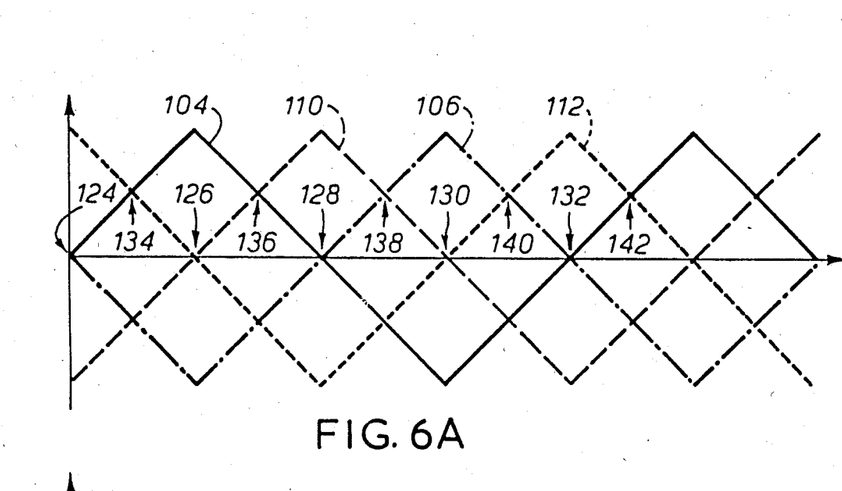
FIG. 6A shows a composite diagram of the four position indicating signals and FIGS. 6B and 6C show the outputs of the first and second comparators respectively generated in response thereto.

FIG. 6A shows a part graph against position for all of the output signals 104, 106, 110, 112 of the transducer. The situation shown is ideal and it should be remembered that all of the disturbing influences mentioned above can disturb this situation, moving the phases, offsets etc. of the various signals.

The zero degree signal 104 is shown in solid line. The ninety degree signal 110 is shown in broken line. The one hundred and eighty degree signal 106 is shown in broken and dotted line. The two hundred and seventy degree signal 112 is shown in dotted line.

When the multiplexer 46 provides the zero degree signal 104 as output, with no demand from the convertor 14, the servo comes to rest at a first rest position 124. Similarly, with no demand, when the ninety degree signal 110, the one hundred and eighty degree signal 106 and the two hundred and seventy degree signal 112 are provided as the output of the multiplexer 46, the servo takes up a second rest position 126, a third rest position 128 and a fourth rest position 130 respectively. When next the zero degree signal is provided as the output of the multiplexer 46, the servo takes up a fifth rest position 132. It is to be understood that there are many rest positions for each signal 104, 106, 110, 112 when it is provided as the output signal of the multiplexer 46.

Whenever a positive demand signal is applied via the convertor 14 the servo moves to the right from its selected rest position and whenever a negative demand signal is applied the servo moves to the left from its selected rest position.

Figure 6B:
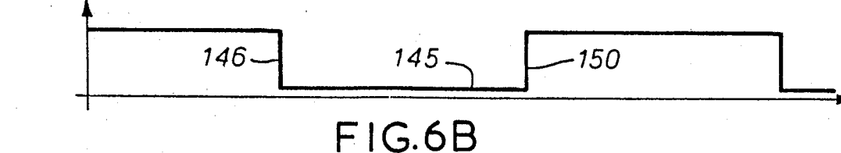
Figure 6C:
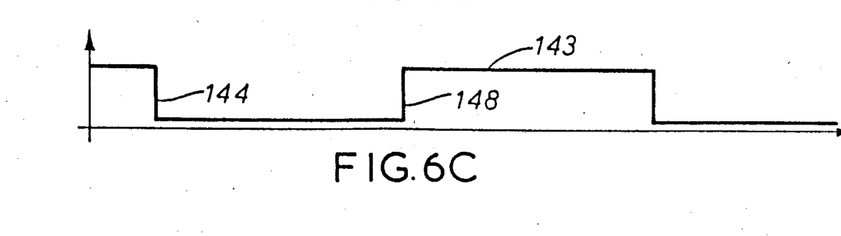

In addition to FIG. 6A, FIG. 6B shows the output of the first comparator 116 and FIG. 6C shows the output of the second comparator 120.

At a first detected position 134, where the zero degree signal 104 just equals and begins to exceed the two hundred and seventy degree signal 112, the output 143 of the second comparator 120 passes from logical truth to logical falseness with a first transition 144. At a second detected position 136, where the zero degree signal 104 just equals and begins to be less than the ninety degree signal 110 the, output 145 of the first comparator 116 shows a second transition 146 from logical truth to logical falseness. At a third detected position 138, where the two hundred and seventy degree signal 112 just equals and begins to exceed the zero degree signal 104, the output 143 of the second comparator 120 displays a third transition 148 from logical falseness to logical truth. At a fourth detected position 140, where the zero degree signal 104 just equals and begins to exceed the ninety degree signal 110, the output 145 of the first comparator 116 displays a fourth transition 150 from logical falseness to logical truth.

It is to be appreciated that the part of the extent of travel of the head 32 is representative of all of the extent of travel of the head 32 and that rest positions and detected positions are available across the entire surface of the disc 34.

The controller 10 first moves the head 32 to a desired part of the disc 32 in any manner well known in the art such as stepping from rest position to rest position or by employing a velocity controlling servo loop. Having arrived at the desired position, the controller 10 executes a command and calibration sequence.

The controller 10 commands the multiplexer 46 to provide the zero degree signal 104 to the summing junction 18. The servomechanism therefore moves to the first rest position 124. The controller 10 then issues a steadily increasing demand word to the convertor 14 and examines the output of the second comparator 116 for the first 144 transition, noting the value of demand required to achieve the first detected position 134 as a first result. The controller 10 then commands the multiplexer 46 to provide the ninety degree signal 110 to the summing junction 18 and reduces demand to zero so bringing the servomechanism to the second rest position 126. The controller 10 then issues negative demand to move the servo to the left and examines the output of the second comparator 116 for the first transition 144 to note the level of demand required to get back to the first detected position 134 from the second rest position 136 as a second result. The controller 10 then issues steadily increasing positive demand and examines the output of the first comparator 116 for the second transition 146 to note down the amount of demand required to reach the second detected point 136 from the second rest point 126 as a third result. The controller 10 then reduces the demand to zero and commands the multiplexer 46 to provide the one hundred and eighty degree signal 106 as the input to the summing junction 18. The servo therefore comes to the third rest position 128. The controller 10 then issues steadily increasing negative demand and examines the output of the first comparator 116 to note as a fourth result the amount of demand required to get back to the second detected position 136 from the third rest position 128 as indicated by the occurrence of the second transition 146. The controller 10 then issues steadily increasing positive demand and examines the output of the second comparator 120 for the third transition 148 to note as a fifth result the amount of demand required to move from the third rest position 128 to the third detected position 138. The controller 10 then commands the multiplexer 46 to the two hundred and seventy degree signal 112 as the input to the summing junction 18 and reduces the demand to zero. The servo therefore comes to rest on the fourth rest position 130. The controller 10 then issues steadily increasing negative demand and examines the output of the second comparator 120 for the third transition 148 to note as a sixth result the amount of demand required to get back to third detected position 138 from the fourth rest position 130. The controller 10 then issues steadily increasing positive demand and examines the output of the first comparator 116 for the fourth transition 150 to determine and note the amount of demand required as a seventh result to get from the fourth rest position 130 to the fourth detected position 140. The controller 10 then commands the multiplexer 46 to provide once more, as the input to the summing junction 18, the zero degree signal 104. The servo has been stepped across the surface of the disc 32 by a full span of phases, and so the servo comes to rest in the fifth rest position 132. The controller 10 then applies increasing negative demand and monitors the output of the first comparator 116 for the fourth transition 150 to determine and note as an eighth result the amount of demand required to get back to the fourth detected position from the fifth rest position.

It is to be noted that the above command and calibration sequence can be performed using more or less than four phases of positioning signals. The controller 10 notes the first through eighth results in terms of the magnitude of the binary number of the required demand levels. The eighth result could of course have been obtained near the beginning of the sequence from the first rest position 124. The sequence need not necessarily be performed in the order described. Those skilled in the art will be aware of other ways of establishing and providing detected positions other than that described. For an example, others of the output signals from the transducer 42 can be compared against one another, the output signals from the transducer 42 can be compared against a fixed level, and so on. All that is required is that the detected positions lie one intermediately between every two rest positions.

The controller, now knowing the total amount of demand equivalent to the span of all of the phases, adds the first through eigth results to give a numerical value to the span. It can then use this result in several ways.

Firstly, it can divide the span by the number of respective rest positions and, taking one of the rest positions as datum, determine the deviation of each other rest position from its ideal in terms of steps of demand as applied through the convertor 14. When returning to one of the rest positions, the controller 10 can apply the inverse correction to bring the position back to the ideal.

Secondly, it can make the correction as described, and further divide the interval between the now idealized rest positions to give an integral multiple number of rest positions. This allows for the doubling, trebling and so on of the number of places in which the system can stop.

Thirdly, the controller 10 can divide the span by any number to provide any number of stopping and operating positions across the span. The deviation of each operating position from the rest positions is calculated and positioning in an operating position accomplished from that rest position from which the deviation, measured in terms of required demand, is least applying inverse deviation.

Figure 7:
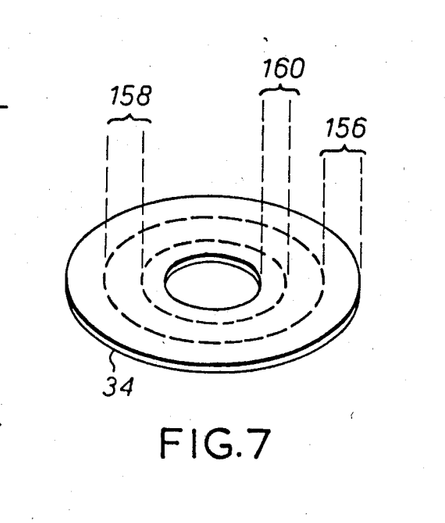
FIG. 7 shows the zones on the disc for performance of the command sequence.

FIG. 7 shows the zoning of the disc 34 to compensate for the change in position signal errors which occur across the range of radial travel of the head 32.

The disc 34 is divided into first, second and third zones 156, 158, 160 respectively each consisting in a continuous band of adjacent radii. The controller 10 performs the command and calibration sequence in each of the zones 156, 160, 158 and calculates and maintains separate correction results for each zone 156, 158, 160. Whenever the head 32 is to be positioned in a particular zone 156, 158, 160 the controller 10 applies the corrections appropriate to that zone. The controller 10 can perform the sequence in the different zones 156, 158, 160 at different times and can perform the sequence at timed intervals after switch on of a disc drive, at switch on, or whenever errors in received data are detected indicating possible mispositioning.

While the invention has been described in its preferred embodiment as applying to linear positioning systems, it is to be appreciated that it applies equally to any rotary positioning system, with special emphasis on rotary positioners using optical rotary encoders in disc cartridge and module drives.

The invention has been described with reference to employing four phases from an optical transducer. It is to be appreciated that any other kind of transducer providing repetitive polyphase positioning signals is equally employable and that any other number of phases is equally acceptable.

While three zones 156, 158, 160 have been shown on a disc 34, it is to be appreciated that only one, or as many zones as are desired can be employed.

What I claim is:
1. A servomechanism for positioning a head relatively to a rotary informational data storage medium, said servomechanism comprising;
   a controller,
   a position transducer mechanically coupled to said head and operable to provide a plurality of cyclic, staggered, head position indicating signals,
   a selector in receipt of said position-indicating signals and responsive to commands from said controller to select one of said position indicating signals as the feedback signal for said servomechanism to position said head in any selectable one of a plurality of rest positions, a position detector in receipt of some or all of said position-indicating signals and operable to indicate to said controller when said head is in each of a plurality of test positions, each intermediate between a pair of said rest positions, and a summing junction coupled to receive a position offset signal from said controller for moving said head from the selected one of said rest positions, where, said controller is operable to select each of said position-indicating signals in turn as said feedback signal and to apply said offset signal and monitor said indication by said detector to determine in each case the amount of offset required to move said head from its selected rest position to the two adjacent test positions, and whereafter said controller is operable to select said position-indicating signals and apply a corrective offset signal to apportion the total amount of offset so discovered among a plurality of equispaced operating positions.

2. A servomechanism according to claim 1 wherein said controller is operable to determine which of said plurality of rest positions lies closest to a desired one of said operating positions, and is operable to select the appropriate one of said plurality of position-indicating signals to bring said head to said closest rest position and to apply said corrective offset to move said head therefrom to lie over said desired operating position.

3. A servomechanism according to claim 2 wherein said plurality of position-indicating signals comprises four position-indicating signals, a first position-indicating signal being nominally in phase opposition with a second position-indicating signal, a third position-indicating signal being nominally in phase opposition with a fourth position-indicating signal, and said third and said fourth position-indicating signals being nominally in collective quadrature with said first and said second position-indicating signals, and wherein a first of said plurality of test positions is that position where said first position-indicating signal is equal to said third position-indicating signal, a second of said plurality of test positions is that position where said first position-indicating signal is equal to said fourth position-indicating signal, a third of said plurality of test positions is that position where said second position-indicating signal is equal to said third position-indicating signal, and a fourth of said plurality of test positions is that position where said second position-indicating signal equals said fourth position-indicating signal.

4. A servomechanism according to claim 3 wherein said transducer comprises first and second generators for generating said first and third position-indicating signals respectively, and first and second signal inverters, respectively coupled to receive said first and third position-indicating signals from said first and second generators and each operable to provide an output being a polarity inversion thereof, the output of said first inverter being provided as said second position-indicating signal and the output of said second invertor being provided as said fourth position-indicating signal.

5. A servomechanism according to claim 4 wherein said detector comprises a first voltage comparator coupled to receive, as first and second inputs, one or other of said first and second position-indicating signals and one or other of said third and fourth position-indicating signals and operable to provide output indicative of the sense of difference in level therebetween, and a second voltage comparator, coupled to receive as first and second inputs whichever one of said first and second position-indicating signals is coupled as the first input to said first voltage comparator and whichever one of said third and fourth position-indicating signals is not provided as said second input to said first voltage comparator and operable to provide output indicative of the sense of difference in level therebetween, the changes in the sense of indication of said first and second comparators being indicative of said head having traversed one of said test positions and the previous and subsequent states of said collective indications by said comparators being indicative of which of said four test positions has been traversed.

6. A servomechanism according to claim 5 wherein said summing junction comprises a digital-to-analog convertor for receiving a binary number from said controller as said offset signal and for providing an analog output signal linearly representative by size and polarity of magnitude and sign of said binary number, said analog signal having said feedback signal suntracted therefrom as a position error signal for said servomechanism.

7. A servomechanism according to any of the preceding claims 1 to 6 wherein said plurality of operating positions is equinumerous with said plurality of rest positions, said controller being operable to take one of said plurality of rest positions as a datum and to divide the total amount of offset discovered between the remaining rest positions to apply a correction making said operating positions as if said rest positions were equispaced.

8. A servomechanism according to any one of claims 1 to 6 wherein said controller is operable to take one out of said plurality of rest positions as a datum and to divide said total amount of offset discovered between a plurality of operating positions being an integral multiple of the number of said plurality of said rest positions.

9. A servomechanism according to any one of claims 1 to 6 wherein said controller is operable to divide said discovered total offset between any number of operating positions within the span defined by said total offset.

* * * * *